United States Patent [19]
Shiao

[11] Patent Number: 6,012,823
[45] Date of Patent: Jan. 11, 2000

[54] MULTI-PURPOSE LIGHT POINTER

[76] Inventor: Hsuan-Sen Shiao, No. 15-1, Lane 369, Min-Chuan Rd., Taichung, Taiwan

[21] Appl. No.: 09/111,595

[22] Filed: Jul. 7, 1998

[51] Int. Cl.[7] ............................. F21V 33/00; F21L 7/00; F21K 27/00
[52] U.S. Cl. ......................... 362/109; 362/259; 362/205
[58] Field of Search ................................... 362/109, 205, 362/259, 394

[56] References Cited

U.S. PATENT DOCUMENTS

| | | | |
|---|---|---|---|
| 3,609,344 | 9/1971 | So | 240/10.66 |
| 4,803,605 | 2/1989 | Schallet et al. | 362/184 |
| 5,913,596 | 6/1999 | Lin | 362/120 |

*Primary Examiner*—Cassandra Spyrou
*Assistant Examiner*—Jared Treas
*Attorney, Agent, or Firm*—Foley & Lardner

[57] ABSTRACT

A light pointer includes a housing defining a guiding slot in a longitudinal direction to retain a slide member therein. The housing has a front wall defining first and second through holes. An indicating light beam emitting unit is disposed in the housing and emits a light beam through the first through hole. The indicating light beam unit includes a beam emitting light source with first and second terminals, and a first switching member to control electrical connection between the beam emitting light source and the first terminal. The first switching member includes a switch body and a switch button. An illuminating light source illuminates light through the second through hole, and has third and fourth terminals. A second switch member controls electrical connection between the third terminal and one electrode of a power source, and includes a rear contact to connect with the power source, and a front contact disposed on the third terminal and spaced from both the switch button and the rear contact. A sliding member is slidable between front and rear positions, and includes a pivot portion distal to the switch body and a proximate actuating portion depressible towards the switch button.

5 Claims, 7 Drawing Sheets

MULTI-PURPOSE LIGHT POINTER

BACKGROUND OF THE INVENTION

1. Field of the Invention

The invention relates to a light pointer, more particularly to a multi-purpose light pointer which incorporates an illuminating function.

2. Description of the Related Art

A conventional light pointer includes an elongated housing, an indicating light beam emitting unit disposed within the housing, and a press button mounted on the housing and operable so as to activate the light beam emitting unit in order to emit an indicating light beam from one end of the housing. It is noted that the utility of the conventional light pointer is limited, and that the user may require some additional functions that the conventional light pointer cannot provide.

SUMMARY OF THE INVENTION

Therefore, the object of this invention is to provide a multi-purpose light pointer which incorporates an illuminating function and some additional functions.

Accordingly, a multi-purpose light pointer of this invention includes an elongated housing, an indicating light beam emitting unit, and an illuminating light source. The housing includes a lateral wall which defines a guiding slot that extends in a longitudinal direction, and a front wall which defines a first through hole and a second through hole inboard to the first through hole. The indicating light beam emitting unit is disposed in the housing and is operable so as to emit a light beam through the first through hole in the longitudinal direction. The indicating light beam emitting unit includes a beam emitting light source that is disposed to be proximate to the first through hole, and that has first and second terminals adapted to be connected electrically to two electrodes of a power source, respectively, and a first switching member to control electrical connection between the beam emitting light source and the first terminal. The first switching member includes a switch body interposed between the beam emitting light source and the first terminal, and a switch button disposed to be movable with respect to the switch body in a transverse direction relative to the longitudinal direction for activating the beam emitting light source. The illuminating light source is disposed in the housing and is operable so as to illuminate light through the second through hole in a direction parallel to the longitudinal direction. The illuminating light source has third and fourth terminals adapted to be connected electrically to the two electrodes of the power source, respectively, and a second switch member adapted to control electrical connection between the third terminal and the respective one of the electrodes of the power source. The second switching member includes a rear contact that is adapted to be connected to the respective one of the electrodes of the power source and that is disposed spacedly from the switch button in the longitudinal direction, and a front contact that is disposed on the third terminal and that is spaced from both the switch button and the rear contact in the longitudinal direction. A sliding member, made of a non-conductive material, is retained in the sliding slot and is slidable in the longitudinal direction between front and rear positions. The sliding member includes a pivot portion distal to the switch body and defining a pivot axis, and a proximate actuating portion disposed to be depressible towards the switch button in the transverse direction and around the pivot axis while the sliding member is at either one of the front and rear positions for moving the switch button with respect to the switch body. An electrically conductive resilient contact member is mounted fixedly on the pivot portion of the sliding member, and has a front tongue member that extends toward the front contact such that when the sliding member is moved to the front position, the front tongue member will abut against the front contact to activate the illuminating light source. The resilient contact member further has a rear tongue member which engages slidably the rear contact such that biasing against the depressing action of the actuating portion is provided solely by the rear tongue member when the sliding member is at the rear position and is provided by the rear tongue member together with the front tongue member when the sliding member is at the front position.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
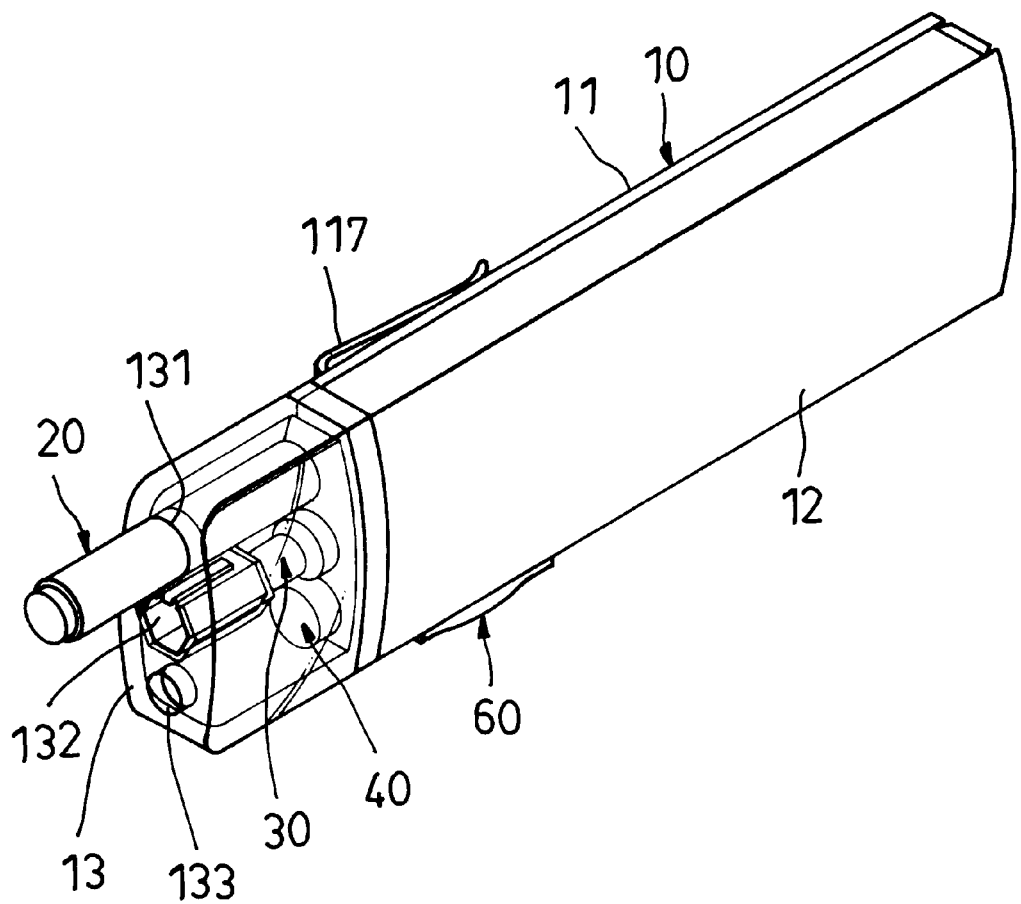
FIG. 1 is a perspective view of a preferred embodiment of a multi-purpose light pointer of this invention.
Figure 2:
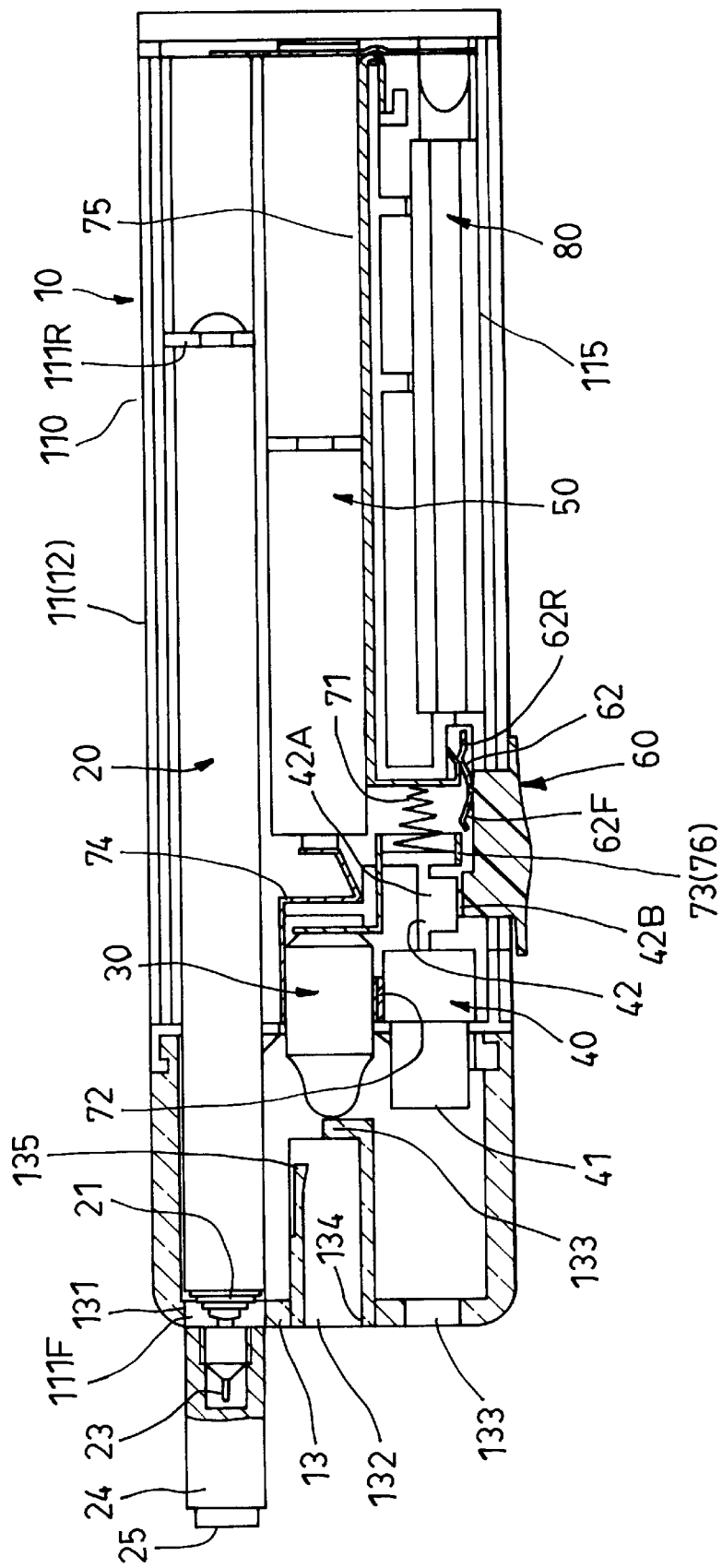
FIG. 2 is a sectional view of the preferred embodiment.

Referring to FIGS. 1, 2, 5 and 6, the preferred embodiment of a multi-purpose light pointer of this invention is shown to include an elongated housing 10, an indicating light beam emitting unit 40, and an illuminating light source 30.

As illustrated, the housing 10, consisting of first and second halves 11, 12, includes a lateral wall 110 which defines a guiding slot 112 that extends in a longitudinal direction, and a front wall 13 which defines a first through hole 133 and a second through hole 132 inboard to the first through hole 133.

The indicating light beam emitting unit 40 is disposed in the housing 10 and is operable so as to emit a light beam through the first through hole 133 in the longitudinal direction. The indicating light beam emitting unit 40 includes a beam emitting light source 41 that is disposed to be proximate to the first through hole 133 and that has first and second terminals 71, 72 adapted to be connected electrically to two electrodes of a power source 50, respectively, and a first switching member 42 to control electrical connection between the beam emitting light source 41 and the first terminal 71. The first switching member 42 includes a switch body 42A interposed between the beam emitting light source 41 and the first terminal 71, and a switch button 42B disposed to be movable with respect to the switch body 42A in a transverse direction relative to the longitudinal direction for activating the beam emitting light source 41.

The illuminating light source 30 is disposed in the housing 10 and is operable so as to illuminate light through the second through hole 132 in a direction parallel to the longitudinal direction. The illuminating light source 30 has a third terminal 73 and a fourth terminal 74 adapted to be connected electrically to the electrodes of the power source 50, respectively, and a second switch member that is adapted to control electrical connection between the third terminal 73 and the respective one of the electrodes of the power source 50.

The second switching member includes a rear contact 75 that is adapted to be connected to the respective one of the electrodes of the power source 50 and that is disposed spacedly from the switch button 42B in the longitudinal direction, a front contact 76 that is disposed on the third terminal 73 and that is spaced from both the switch button 42B and the rear contact 75 in the longitudinal direction, and a sliding member 60 made of a non-conductive material. The sliding member 60 is retained in the guiding slot 112 and is slidable in the longitudinal direction between a front position and a rear position. The sliding member 60 includes a pivot portion 60A distal to the switch body 42A and defining a pivot axis, and a proximate actuating portion 60B disposed to be depressible towards the switch button 42B in the transverse direction and around the pivot axis when the sliding member 60 is at either one of the front and rear positions for moving the switch button 42B with respect to the switch body 42A. The second switching member further includes an electrically conductive resilient contact member 62 mounted fixedly on the pivot portion 60A of the sliding member 60. The resilient contact member 62 has a front tongue member 62F that extends toward the front contact 76 such that when the sliding member 60 is moved to the front position, the front tongue member 60F will abut against the front contact 76 to activate the illuminating light source 30. The contact member 62 further has a rear tongue member 62R that engages slidably the rear contact 75 such that biasing against the depressing action on the actuating portion 60B is provided solely by the rear tongue member 62R when the sliding member 60 is at the rear position and by the rear tongue member 62R together with the front tongue member 62F when the sliding member 60 is at the front position.

The preferred embodiment further includes a tool bit retaining member 134 interposed between the second through hole 132 and the light illuminating source 30 inside the housing 10 and adapted to retain a tool bit 80 non-rotatably therein. The tool bit retaining member 134 includes a resilient retainer 135 that is adapted to provide an inward biasing action along the transverse direction so as to retain snugly the tool bit 80 in the retaining member 134. The retaining member 134 further includes a barrier portion 133 interposed between the resilient retainer 134 and the illuminating light source 30 so as to shield the illuminating light source 30 from being impacted by the tool bit 80 (see FIG. 6).

Figure 4:
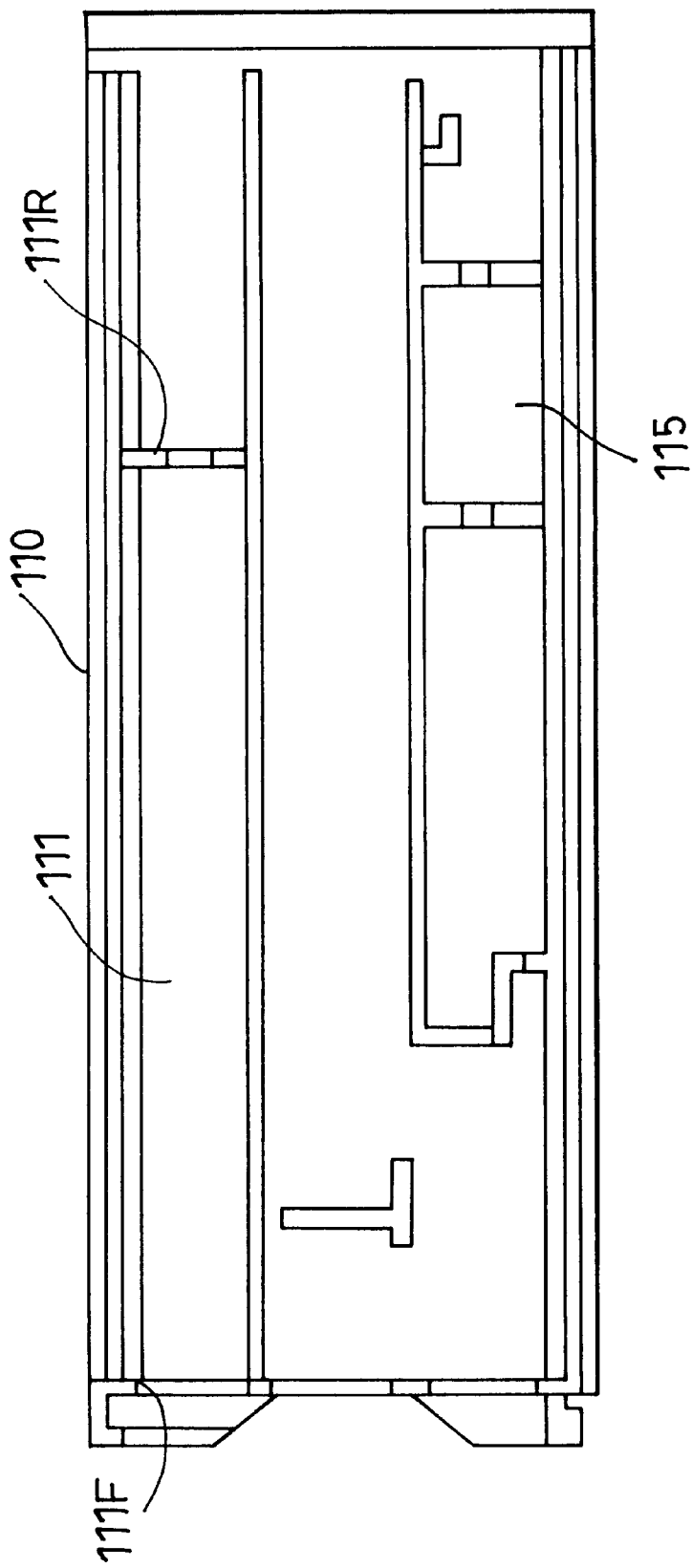
FIG. 4 is schematic view of a housing half of the preferred embodiment.
Figure 5:
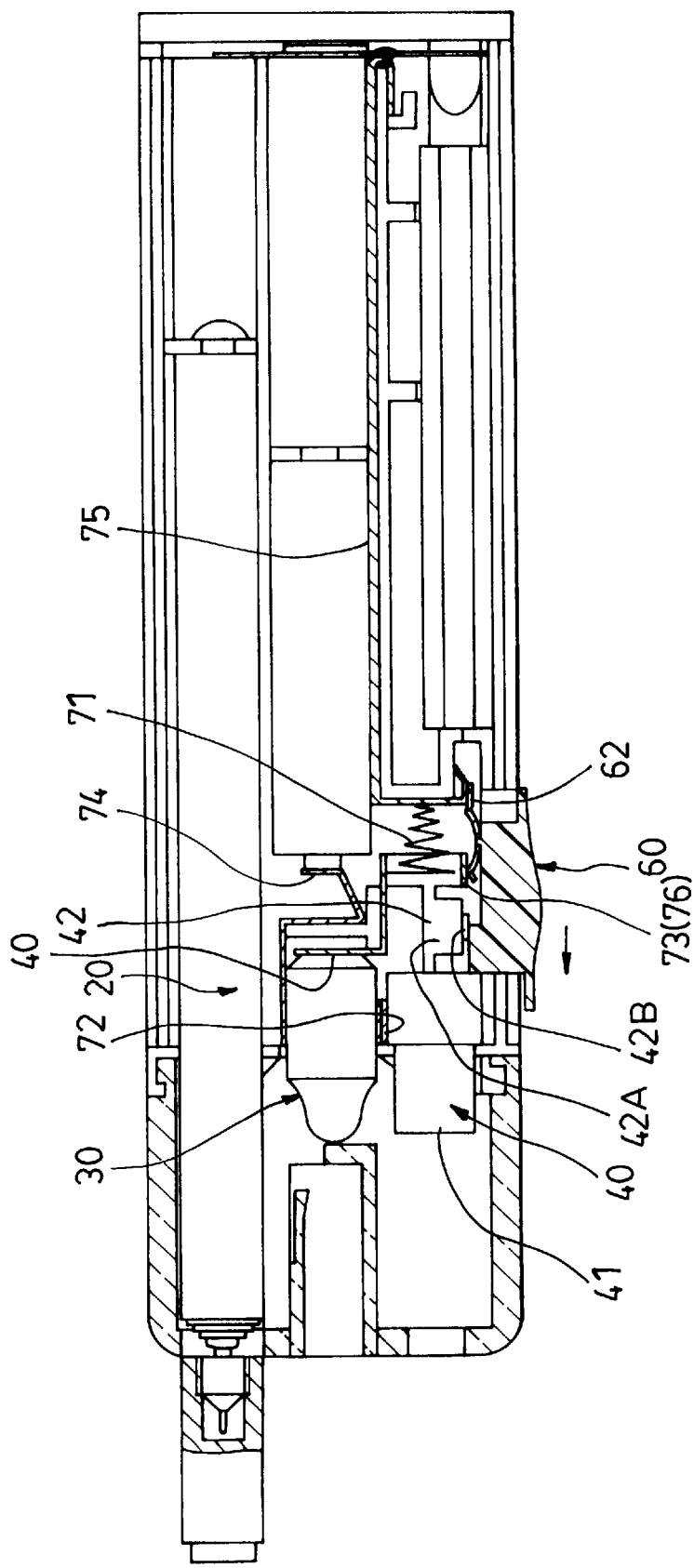
FIG. 5 is a sectional view of the preferred embodiment, illustrating how an indicating light beam emitting unit and an illuminating light source can be simultaneously activated.
Figure 6:
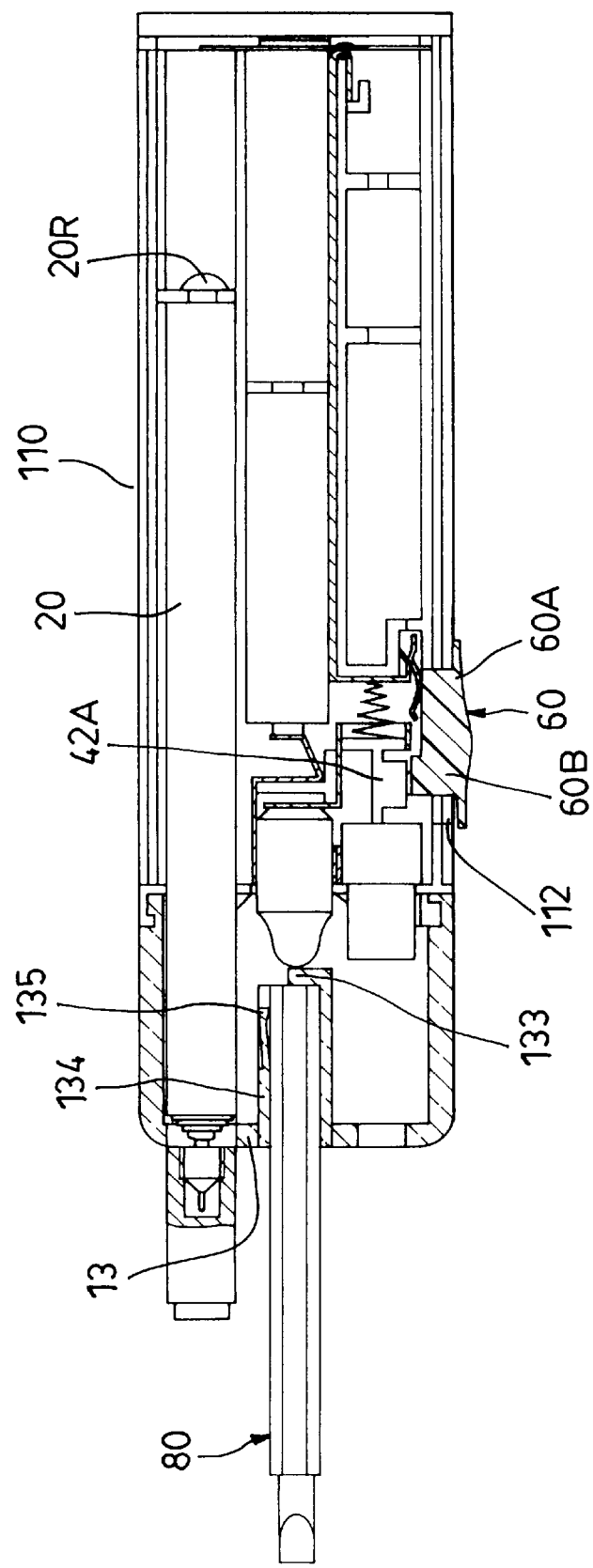
FIG. 6 illustrates how the preferred embodiment can be used as a screw driver.

The front wall 13 further defines a third through hole 131 that extends in an axial direction parallel to the longitudinal direction, and a receptacle 111 that extends in the axial direction to form a front end 111F and a rear end 111R (see FIG. 4). The preferred embodiment further includes a telescopic indicating stick member 20 disposed in the receptacle 111 which has an inner end 20R (see FIG. 6) fixed at the rear end 111R such that the indicating stick member 20 is retractable rearwardly of the front end 111F.

The housing 10 of the preferred embodiment further includes a tool bit storage chamber 115 that is disposed posterior to the second switching member and that extends in the axial direction for storing the tool bit 80 therein (see FIG. 1) when the latter is not in use.

Figure 3:
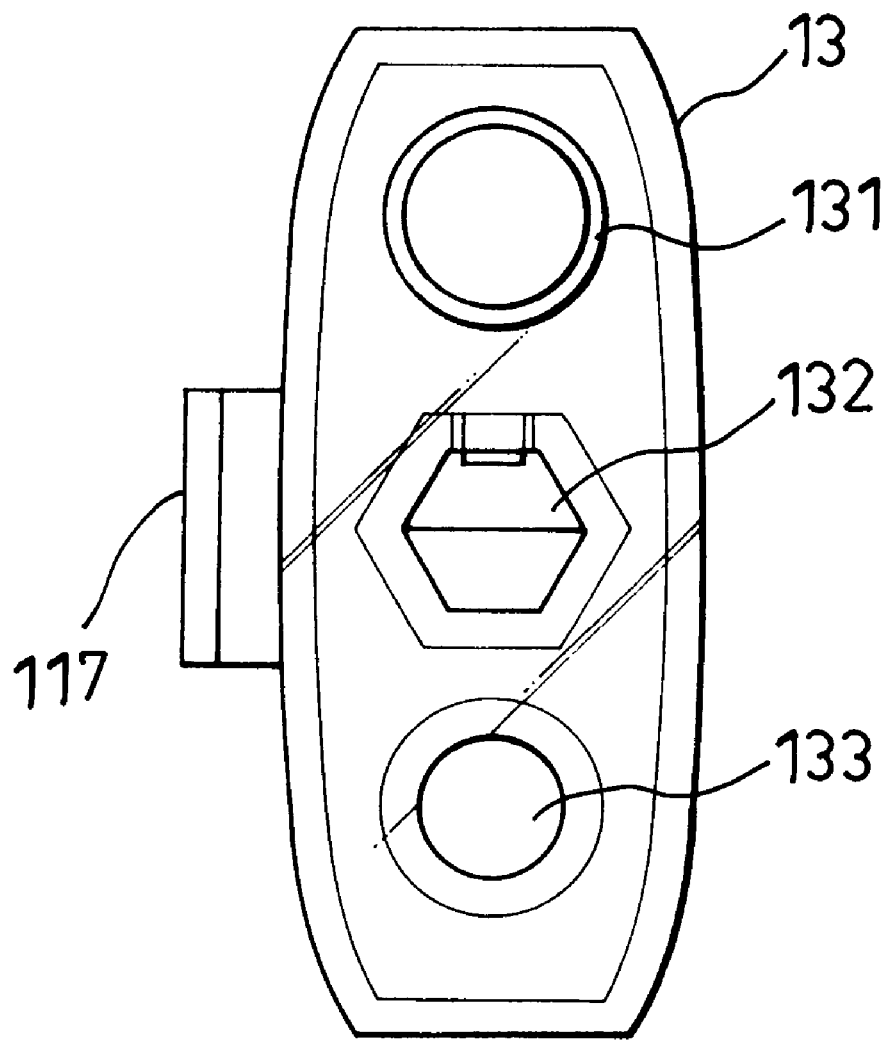
FIG. 3 is a front view of the preferred embodiment.

To facilitate carrying thereof, a clip member 117 is fixed on the housing 10 (see FIG. 3) so that the preferred embodiment can be easily clipped onto a pocket.

Since the user may occasionally need to take some notes, a writing instrument 23 is provided axially on an innermost section 21 of the telescopic indicating stick 20. A cap member 24 is sleeved on the writing instrument 23 to protect the same. A magnet 25 is mounted on the cap member 24 in order to facilitate searching for a pin and the like.

Figure 7:
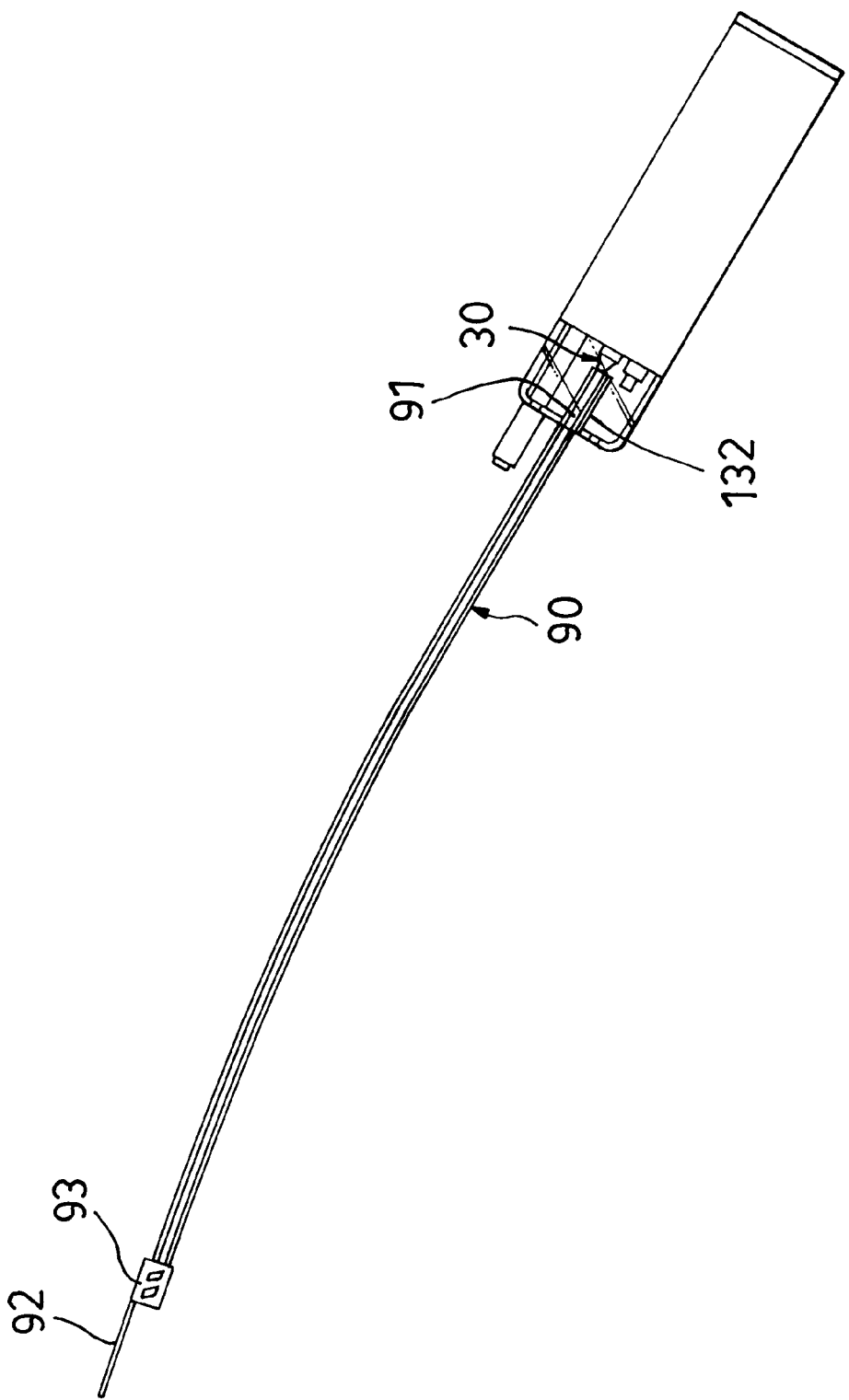
FIG. 7 illustrates how the preferred embodiment is used in another way.

As shown in FIG. 7, a light conducting rod 90 has a distal end 93 provided with an angularly adjustable mirror 92, and an insert end 91 adapted to be inserted non-rotatably in the second through hole 132. As such, when the illuminating light source 30 is switched on, and after angular adjustment of the mirror 92 relative to an axis of the light conductive rod 90, the user of the preferred embodiment can illuminate a dead corner, which is normally beyond the reach of the light illuminating source 30.

With this invention thus explained, it is apparent that numerous modifications and variations can be made without departing from the scope and spirit of this invention. It is therefore intended that this invention be limited only as indicated in the appended claims.

I claim:

1. A light pointer comprising:

a housing including a lateral wall which defines a guiding slot that extends in a longitudinal direction, and a front wall which defines a first through hole and a second through hole inboard to said first through hole;

an indicating light beam emitting unit disposed in said housing and operable so as to emit a light beam through said first through hole in said longitudinal direction, said light beam emitting unit including a beam emitting light source that is disposed to be proximate to said first through hole, and that has a first terminal and a second terminal adapted to be connected electrically to two electrodes of a power source, respectively, and a first switching member to control electrical connection between said beam emitting light source and said first terminal, said first switching member including a switch body interposed between said beam emitting light source and said first terminal, and a switch button disposed to be movable with respect to said switch body in a transverse direction relative to said longitudinal direction for activating said beam emitting light source;

an illuminating light source disposed in said housing and operable so as to illuminate light through said second through hole in a direction parallel to said longitudinal direction, said illuminating light source having a third terminal and a fourth terminal adapted to be connected electrically to the two electrodes of the power source, respectively, and a second switching member adapted to control electrical connection between said third terminal and the respective one of the electrodes of the power source, said second switching member including:

a rear contact adapted to be connected to the respective one of the electrodes of the power source and disposed spacedly from said switch button in said longitudinal direction;

a front contact disposed on said third terminal and spaced from both said switch button and said rear contact in said longitudinal direction;

a sliding member, made of a non-conductive material, retained in said sliding slot and slidable in said longitudinal direction between a front position and a rear position, said sliding member including a pivot portion distal to said switch body and defining a pivot axis, and a proximate actuating portion disposed to be depressible towards said switch button in said transverse direction and around said pivot axis while said sliding member is at either one of said front and rear positions for moving said switch button with respect to said switch body; and an electrically conductive resilient contact member mounted fixedly on said pivot portion of said sliding member, and having a front tongue member which extends toward said front contact such that when said sliding member is moved to said front position, said front tongue member will abut against said front contact to activate said illuminating light source, said resilient contact member further having a rear tongue member which engages slidably said rear contact such that biasing against depressing action on said actuating portion is provided solely by said rear tongue member when said sliding member is at said rear position and is provided by said rear tongue member together with said front tongue member when said sliding member is at said front position.

2. The light pointer as defined in claim 1, further comprising a tool bit retaining member interposed between said second through hole and said illuminating light source inside said housing and adapted to retain a tool bit non-rotatably therein, said tool bit retaining member including a resilient retainer adapted to provide an inward biasing action along said transverse direction so as to retain snugly the tool bit in said retaining member.

3. The light pointer as defined in claim 2, wherein said retaining member further includes a barrier portion interposed between said resilient retainer and said illuminating light source inside said housing so as to shield said illuminating light source from being impacted by the tool bit.

4. The light pointer as defined in claim 1, wherein said front wall further defines a third through hole extending in an axial direction parallel to said longitudinal direction, and a receptacle extending in said axial direction to form a front end and a rear end, said light pointer further comprising a telescopic indicating stick member disposed in said receptacle and having an inner end fixed at said rear end such that said indicating stick member is retractable rearwardly of said front end.

5. The light pointer as defined in claim 2, wherein said housing further includes a tool bit storage chamber posterior to said second switching member and extending in said axial direction, said storage chamber being adapted to store the tool bit therein.

* * * * *